United States Patent [19]

Meyer

[11] 4,013,478
[45] Mar. 22, 1977

[54] PROCESS FOR INCREASING RESISTANCE OF GLASS PRODUCTS TO CEMENT AND CEMENTITIOUS MIXTURES THEREOF

[75] Inventor: Helmut Meyer, Mainz-Gonsenheim, Germany

[73] Assignee: Jenaer Glaswerk Schott & Gen., Mainz, Germany

[22] Filed: Jan. 24, 1975

[21] Appl. No.: 543,788

[30] Foreign Application Priority Data

Jan. 26, 1974  Germany .......................... 2403751

[52] U.S. Cl. ................................... 106/98; 106/50; 106/99
[51] Int. Cl.² ......................................... C04B 7/02
[58] Field of Search ................... 106/90, 98, 99, 50

[56] References Cited

UNITED STATES PATENTS

| 1,140,124 | 5/1915 | Dalen | 106/99 |
| 2,170,434 | 8/1939 | Seigle | 106/99 |
| 2,738,285 | 3/1956 | Biefeld | 106/99 |
| 2,793,130 | 5/1957 | Shannon | 106/99 |
| 3,102,038 | 8/1963 | Fisher | 106/84 |
| 3,552,357 | 1/1971 | Quayle | 106/99 X |
| 3,622,361 | 11/1971 | Pennington | 106/99 X |
| 3,650,785 | 3/1972 | Ball | 106/99 X |
| 3,736,162 | 4/1973 | Chvaiovsky | 106/50 X |
| 3,884,705 | 4/1975 | Blair | 106/84 X |

*Primary Examiner*—Winston A. Douglas
*Assistant Examiner*—John F. Niebling
*Attorney, Agent, or Firm*—Stanley D. Schwartz

[57] ABSTRACT

A process is disclosed to increase the resistance of glass products to alkaline cement liquors by coating the surface of the glass products with an effective amount of a water-soluble zinc compound. Cement compositions comprising a cementitious matrix and glass products produced in accordance with the process of this invention are also disclosed herein.

23 Claims, No Drawings

PROCESS FOR INCREASING RESISTANCE OF GLASS PRODUCTS TO CEMENT AND CEMENTITIOUS MIXTURES THEREOF

BACKGROUND OF THE INVENTION

The present invention relates to glass products and a process for making the same wherein the glass products, and in particular, fiberglass filaments, exhibit an enhanced resistance to corrosion by cement liquors. The glass products are thereby rendered suitable for the production of composite materials containing cement and/or concrete.

It has been known that cement, mortar, and concrete materials have a low resistance to tension, bending, and impact stresses, but said resistance can be considerably increased by the addition, for example, of fiberglass filaments. This is particularly true when the glass filaments are introduced into the cement in the form of organized skeins of thread, or as cut threads whose filaments are arranged parallel to each other rather than in the form of snarled wool. In large scale technical production, such continuous filaments are predominantly made of E-glass.

It has been found, however, that glass filaments, e.g., E-glass filaments, become highly corroded when incorporated into Portland cement and other cementitious products due to the high alkalinity of said cement thereby causing the strengthening effect of the filaments to become completely lost. This alkali attack and subsequent fiber strength loss generally so weakens the fibers that long term reinforcement of a cement matrix by glass fibers, e.g., E-glass fibers, is neither predictable nor dependable.

In order to increase the resistance of fiberglass filaments to corrosion, several methods have been used in the prior art including (1) the coating of the fiberglass filaments with plastics; and (2) the use of highly alkaline-resistant types of glass filaments. The first method is not satisfactory because of its poor adhesion to a cement matrix as well as the difficulty of producing a lasting, dense coating on said glass filaments.

With respect to the alkali-resistant glasses, e.g., the $Na_2O$-$ZrO_2$-$SiO_2$-system, they are much less corroded than E-glass, but their destruction is merely delayed. The alkali-resistant glasses further have the disadvantage in that they are considerably more difficult to melt and extrude into filaments than E-glass.

OBJECTS OF THE PRESENT INVENTION

It is therefore a significant object of the present invention to render the surface of glass products and fiberglass filaments, which by themselves have no resistance to cement but do exhibit favorable mechanical properties (great strength and stress modulus) and may be produced in accordance with this invention thereby rendering said fiberglass filaments and glass products resistant to any corrosion by cement liquor.

Consistent with the primary object of this invention is a process for increasing the resistance of glass products to highly alkaline, cement liquors.

A still further object of this invention is the provision of a glass fiber product exhibiting good adhesion to a cement matrix to thereby enable more complete utilization of the strength properties of the glass fibers when incorporated as a reinforcement agent for cements.

BRIEF SUMMARY OF THE INVENTION

Briefly, the present invention relates to a process for increasing the resistance of glass products to highly alkaline cement liquors. The process comprises coating the glass products with a water-soluble zinc salt and thereafter drying the same.

According to another embodiment of the invention, cementitious products containing a glass fiber substrate and a water-soluble zinc salt coating thereon are also described herein.

DETAILED DESCRIPTION OF THE INVENTION

The water-soluble zinc compounds useful in the practice of this invention are zinc salts of weak acids (organic and inorganic). The term "weak acid" is intended to include those acids having an ionization constant of less than about $k = 5 \times 10^{-2}$.

Useful water-soluble zinc salts include salts of inorganic acids, and organic acids, e.g., monocarboxylic acids, dicarboxylic acids and aliphatic and aromatic fatty acids. Preferred zinc salts are zinc formate, zinc acetate and zinc oxalate.

The amount of zinc compounds applied to the surface of glass products will vary according to the surface area, thickness of the fiber and the nature of the zinc compound used. Effective amounts of zinc compound applied to the surface of the glass products wherein said glass products are fibers having a 10$\mu$m thickness is between about 0.2 to 1.0 weight percent based upon the weight of the fiber, in terms of equivalent amounts of ZnO being applied to the surface of a glass product or fiber. This is preferable between 0.6 and 0.8 weight percent, based on the weight of the glass fiber.

The zinc compounds can be applied to the surfaces of glass products either in the form of an aqueous solution or preferably as part of a sizing composition. It is understood that although it is preferable to apply the zinc compounds simultaneously and in combination with a sizing composition, it is not necessary to do so, but a sizing composition must be applied to the glass products in order to achieve the desirable results of this invention and to protect the fibers during further processing.

The sizing compositions used in the practice of this invention include conventional sizing compositions containing conventional additives. More specifically, the sizing compositions used in the practice of this invention consist essentially of film-forming agents and lubricants. Typical film-forming agents include, e.g., starch, dextrin, vinyl acetate, polyester resins and the like which are formulated with lubricants such as vegetable oils, vegetable fats, poly fatty acid amides, etc.

The sizing compositions generally contain from about 1.5 to 4 weight percent of a film-forming agent and from 0.05 to 0.2 weight percent of a lubricant (both calculated on total solids present). When a zinc compound is formulated with the sizing composition and simultaneously therewith in the practice of this invention, it is desirable to employ from about 2 to 8 weight percent thereof based on the total weight of the composition. With or without the presence of the zinc compound, the balance of the sizing composition contains water. It is understood that other conventional sizing composition additives may be incorporated into the sizing compositions.

As noted above, the glass filaments may also be treated with an aqueous solution of the zinc compound in addition to the treatment of glass filaments with a sizing composition. When an aqueous solution of zinc compound is used, the filaments can be treated with the zinc compound by dipping or spraying the filaments or fibers with an aqueous solution containing a concentration of zinc salt of about 2 to 8 grams per liter.

The coating of the glass products or fibers preferably takes place immediately after the extrusion of the glass products or fibers. After the zinc salt and sizing composition have been applied to the glass products or fibers, the latter products and/or fibers are thereafter subjected to a drying operation. The drying operation preferably takes place at elevated temperatures and generally between about 60° and 135° C and preferably between 100° and 135° C.

During the coating and drying operations, the zinc salts are believed to decompose thereby resulting in the formation of coated glass products and/or fibers having exceptional resistance to corrosion by cement liquors together with improved adhesion properties when incorporated into a cement matrix, e.g., Portland cement. Although the exact mechanism is not known, it is believed that the zinc salts decompose to form zinc oxide which is believed to react with the tricalcium silicate in cement to form $Ca[Zn(OH)_3 \cdot H_2O]_2$ which is then believed to react with other components of cement and possibly the glass fiber.

When continuous fibers or filaments have been processed in accordance with this invention, and have been copped and dried, the filaments may then by processed further into rovings, cut fiberglass, filaments, mattings, fabrics or other types of products by means of conventional methods of technology.

Other glass products, including, e.g., foamed glass balls and hollow glass balls used, for example, in the production of light-weight concrete, may be made resistant to corrosion by cement liquor in a similarly simple manner. Broken glass used as an additive to cement may also be protected in this way be means of the process according to the present invention.

Cementitious mixtures, e.g., Portland cement, mortar and concrete, containing the glass fibers treated in accordance with this invention, are generally incorporated therein in an amount between about 4 and 10 weight percent of said composition.

It is further understood that the process of this invention is applicable to any glass fiber with E-glass being the preferred fiber. E-glass has the following composition:

| Component | Weight Percent |
|---|---|
| $SiO_2$ | 54.5 |
| $Al_2O_3$ | 14.5 |
| $B_2O_3$ | 7.5 |
| $CaO$ | 17.0 |
| $MgO$ | 4.5 |
| alkali metal oxides | 0.8 |

The invention is described in greater detail when reference is given to the following example, which describes the coating of fiberglass filaments and the resistance obtained thereby to any corrosion by cement liquor.

EXAMPLE

A sizing composition is produced by dissolving 600 grams of zinc acetate in one liter of water. An aqueous dispersion is then added consisting of 600 grams vinyl acetate and 25 grams of fat (derivative of tallow, i.e., ethoxylated fatty acid polyamine). A sufficient amount of water is thereafter added until the solution consists of a total of 10 liters.

The zinc containing sizing composition is applied to E-glass filaments having a diameter of $10\mu$, in a conventional manner by utilizing a sizing applicator located between the fiberglass extrusion nozzles and the copping drum for the thread. The spun cake obtained in this manner is then dried at 120° C and is rewound into a 60-denier skein.

A test on the resistance of these fibers to cement was then conducted in such a way that the results represent the effects of cement on the filaments under severe test conditions. To measure the extent of corrosion of the filaments, the decrease of tensile strength over a period of time was determined for filaments lying in cement liquor, at room temperature. Then cement liquor was prepared by dispersing 1 part of pulverized Portland cement (PZ 350) in 10 parts of water and shaking the mixture in a container for 12 hours. The aqueous extract having a pH-value of 12.6 was then filtered off. 50 Milligrams of fiberglass filaments were each placed into one plastic flask having a 50 cc capacity, which was then filled with cement liquor and closed. The filaments were taken out after varying periods of testing, rinsed in water and acetone and then dried at 60° C. The strength of the filaments was determined by examining individual filaments and comparing tensile properties with original tensile properties in a tensile test.

Untreated E-Fiberglass filaments, and highly alkali-resistant glass fibers of the $Na_2O-ZrO_2-SiO_2$-system were exposed to the cement liquor under the same conditions for comparative purposes, and then the decrease in the tensile strength of these fibers was measured and compared with the fibers treated with zinc acetate.

The data showing the progressive decrease in strength, over a 4-week period in which the fibers were stored in cement liquor, clearly indicate the excellent resistance properties of the E-Fiberglass filaments which were treated with zinc compounds. This comparative data is set forth in the Table below.

| Time of Storage in Cement Liquor (Weeks) at room temperatures | Strength of Fibers in % of Initial Tensile Strength | | |
|---|---|---|---|
| | E-Glass Treated with $Zn(CH_3COO)_2 \cdot 2H_2O$ | Strength Untreated E-Glass | $Na_2O-ZrO_2-SiO_2$-Glass |
| 1 | 99 | 67 | 97 |
| 2 | 98 | 43 | 81 |
| 3 | 96 | 33 | 74 |
| 4 | 93 | 25 | 71 |

It will be understood that other changes may be made with respect to the formulations, methods of application and treatment, without departing from the spirit of the invention, especially as defined in the following claims.

What is claimed is:

1. In a process for making a reinforced Portland-type cement product, the steps comprising: (a) coating glass products useful for the reinforcement of said cement with an effective amount of a water-soluble zinc salt of a weak acid; and (b) incorporating said coated glass products into said cement.

2. The process of claim 1, wherein said weak acid is an organic acid.

3. The process of claim 2, wherein said zinc salt is zinc formate, zinc acetate or zinc oxalate.

4. The process of claim 1, wherein said weak acid is an inorganic acid.

5. The process of claim 1, wherein said glass product is a fiberglass filament.

6. The process of claim 5, wherein said fiberglass filaments consist of E-glass.

7. The process of claim 1, which further comprises applying a sizing composition to said glass products, said composition consisting essentially of 1.5 to 4 weight percent of a film forming agent and from 0.05 to 0.2 weight percent lubricant and the remainder being water.

8. The process of claim 7, wherein said film forming agent is starch, dextrine, vinyl acetate, polyester resin or mixtures thereof, and said lubricant is vegetable oil, vegetable fat, poly fatty acid amides, or mixtures thereof.

9. The process of claim 8, wherein said sizing composition is applied to glass filaments simultaneously with the application of said zinc salt.

10. The process of claim 9, wherein the composition contains from 2 to 8 percent of said zinc salt.

11. The process of claim 10 further comprising the steps of initially extruding fiberglass filaments, applying said sizing composition and said zinc salt as a coating onto the surface of said filaments, thereafter drying said coating on the glass surfaces at a temperature of from between about 100° and 135° C.

12. The process of claim 1, which further comprises initially extruding fiberglass filaments and immediately thereafter coating the surface of said fiberglass filaments with said zinc salt.

13. The process of claim 12, which further comprises drying said coating on the glass surfaces at a temperature between about 100° and 135° C.

14. A cement composition comprising a Portland-type cementitious matrix and glass products dispersed throughout said matrix as a reinforcement therefor, said glass products having a coating consisting essentially of a water soluble zinc salt of a weak acid applied to the surfaces of said glass products.

15. The cement composition of claim 14, wherein said weak acid is an organic acid.

16. The cement composition of claim 14, wherein said zinc salt is zinc formate, zinc acetate or zinc oxalate.

17. The cement composition of claim 14, wherein said weak acid is an inorganic acid.

18. The cement composition of claim 14, wherein said glass product is a fiberglass filament.

19. The cement composition of claim 18, wherein said fiberglass filaments consist of E-glass.

20. The cement composition of claim 14, which further comprises a sizing composition consisting essentially of 1.5 to 4 weight percent of a film forming agent and from 0.05 to 0.2 weight percent lubricant and the remainder being water.

21. The cement composition of claim 20, wherein said film forming agent is starch, dextrine, vinyl acetate, polyester resin or mixtures thereof, and said lubricant is vegetable oil, vegetable fat, poly fatty acid amides, or mixtures thereof.

22. The cement composition of claim 21, wherein the composition contains from 2 to 8 percent of said zinc salt.

23. The cement composition of claim 15, wherein said cementitious matrix is Portland cement and said composition contains from about 4 to 10 weight percent of said glass products.

* * * * *